(12) United States Patent
Evans et al.

(10) Patent No.: US 12,066,530 B2
(45) Date of Patent: Aug. 20, 2024

(54) RADAR-BASED METHOD AND APPARATUS FOR GENERATING A MODEL OF AN OBJECT RELATIVE TO A VEHICLE

(71) Applicant: THE BOEING COMPANY, Chicago, IL (US)

(72) Inventors: Nick Shadbeh Evans, Lynnwood, WA (US); William K. Leach, Castro Valley, CA (US); Deepak Khosla, Malibu, CA (US); Leon Nguyen, Malibu, CA (US); Michelle D. Warren, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 344 days.

(21) Appl. No.: 17/689,069

(22) Filed: Mar. 8, 2022

(65) Prior Publication Data
US 2022/0404490 A1 Dec. 22, 2022

Related U.S. Application Data

(60) Provisional application No. 63/211,141, filed on Jun. 16, 2021.

(51) Int. Cl.
*G01S 13/935* (2020.01)
*G01S 7/41* (2006.01)
*G01S 7/48* (2006.01)

(52) U.S. Cl.
CPC .......... *G01S 13/935* (2020.01); *G01S 7/417* (2013.01); *G01S 7/4802* (2013.01)

(58) Field of Classification Search
None
See application file for complete search history.

(56) References Cited

U.S. PATENT DOCUMENTS

| 10,353,053 | B2 | 7/2019 | Rohani et al. |
| 2019/0120936 | A1 | 4/2019 | Chakraborty et al. |
| 2019/0349365 | A1 | 11/2019 | Sambhwani et al. |

(Continued)

FOREIGN PATENT DOCUMENTS

| WO | WO2018/183546 A1 * | 10/2018 | ........... G01S 13/582 |
| WO | WO 2019/195327 A1 | 10/2019 | |

OTHER PUBLICATIONS

Ishitsuka, Kazuya et al., "Object Detection in Ground-Penetrating Radar Images Using a Deep Convolutional Neural Network and Image Set Preparation by Migration," International Journal of Geophysics, 2018(9365184), 8 pgs., (Nov. 2018).

(Continued)

*Primary Examiner* — Bernarr E Gregory
(74) *Attorney, Agent, or Firm* — ALSTON & BIRD LLP

(57) ABSTRACT

A method, apparatus and computer program product are provided to generate a model of one or more objects relative to a vehicle. In the context of a method, radar information is received in the form of in-phase quadrature (IQ) data and the IQ data is converted to one or more first range-doppler maps. The method further includes evaluating the one or more first range-doppler maps with a machine learning model to generate the model that captures the detection of the one or more objects relative to the vehicle. A corresponding apparatus and computer program product are also provided.

20 Claims, 7 Drawing Sheets

(56) References Cited

U.S. PATENT DOCUMENTS

2020/0041612 A1* 2/2020 Harrison ............... G01S 7/417
2020/0249314 A1* 8/2020 Eshet .................... G01S 7/417
2020/0341109 A1* 10/2020 Meissner ............... G01S 7/417

OTHER PUBLICATIONS

Zhang, Guoquiang et al., "Object detection and 3d estimation via an FMCW radar using a fully convolutional network." ICASSP 2020-2020 IEEE International Conference on Acoustics, Speech and Signal Processing (ICASSP). IEEE, 5 pgs., (2020).

* cited by examiner

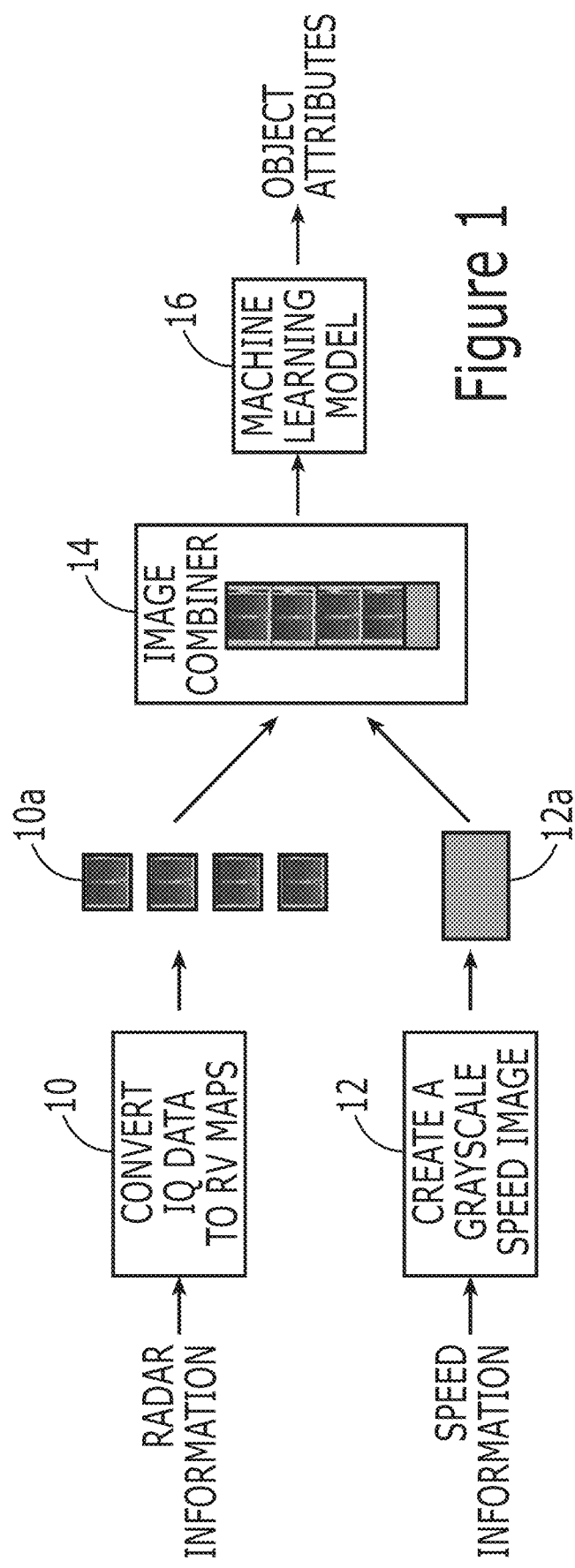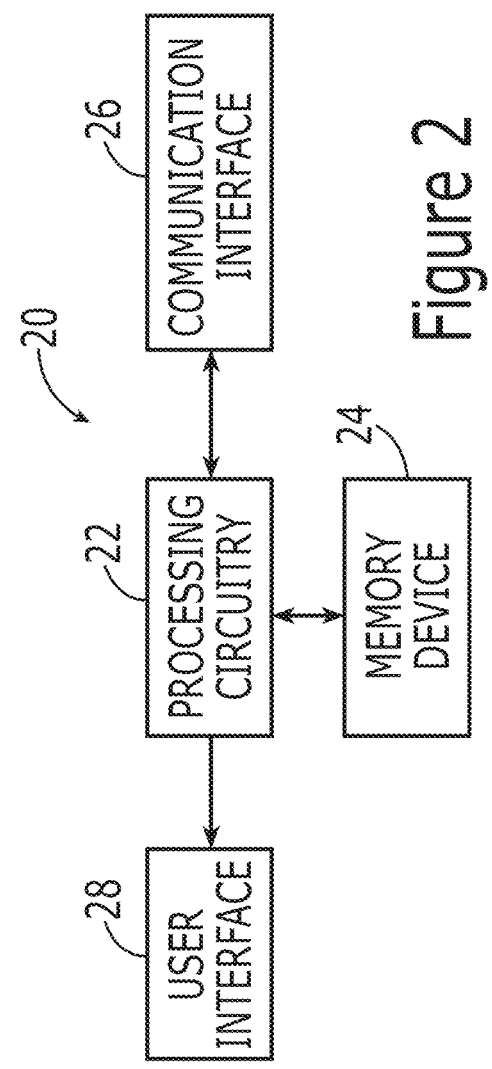

RADAR-BASED METHOD AND APPARATUS FOR GENERATING A MODEL OF AN OBJECT RELATIVE TO A VEHICLE

CROSS-REFERENCE TO RELATED APPLICATIONS

This application claims benefit of U.S. Provisional Application No. 63/211,141, filed Jun. 16, 2021, the entire contents of which are incorporated herein by reference.

TECHNOLOGICAL FIELD

An example embodiment relates generally to the generation of a model of an object and, more particularly, to a radar-based method and apparatus for generating a model of an object relative to a vehicle.

BACKGROUND

Radar is utilized for a variety of purposes including the identification of objects in a scene. For example, aircraft in flight may employ radar systems in order to identify objects, such as other aircraft, in its vicinity. Based on the objects that are identified utilizing a radar system, the aircraft can establish or confirm a flight path that safely avoids the other objects identified by the radar system. Other radar systems may be located on the ground, but may be configured to identify objects in the sky, such as airborne objects in the vicinity of the radar system. For example, airports may include ground-based radar systems to identify airborne aircraft in the vicinity of the airport and to correspondingly assist aircraft in safely navigating to and from the airport relative to the other aircraft identified to be in flight in the vicinity of the airport.

While radar systems are useful for reliably identifying objects, such as aircraft, that are in flight, in-air radar systems have not proved as reliable for identifying objects on the ground. In this regard, the radar signals that endeavor to identify objects on the ground are generally noisy and include a significant amount of ground clutter, thereby leading to difficulties in reliably identifying objects on the ground that are in the vicinity of the radar system. Even if such ground-based objects are identified, the confidence associated with the identification of such ground-based objects may be quite low and therefore of limited use.

Although radar systems are not as successful in reliably identifying ground-based objects with sufficient confidence, it is desirable in a number of instances to identify such ground-based objects. For example, an aircraft in flight may be approaching an airport and intend to land on a runway at the airport. As such, the aircraft or the pilots on board the aircraft desire to identify the runway and, in particular, to identify the location, bearing and elevation of the runway to facilitate the landing of the aircraft on the runway. A radar system on board the aircraft cannot typically identify the runway with sufficient precision due to noise attributable to ground clutter. As such, an aircraft or the pilots on board the aircraft may employ other techniques for identifying the runway including visual identification of the runway, the use of an instrument landing system (ILS) and/or the use of a global positioning system (GPS) and/or a satellite-based augmentation system (SBAS). While these other techniques are useful for identifying a runway, these techniques may be somewhat limited in certain circumstances. For example, fog or other weather conditions that may at least partially obscure a runway may limit the utilization of visual runway identification techniques and/or the use of ILS, while GPS and/or SBAS systems may sometimes have a limited accuracy.

Additionally, aircraft and the pilots on board aircraft performing taxiing operations on the ground may also desire to identify the ground-based objects in the vicinity of the aircraft, such as those objects in or near the anticipated path of travel of the taxiing aircraft. However, the radar systems on board the aircraft or the ground-based radar systems of the airport may not be able to reliably identify the other ground-based objects in the vicinity of the taxiing aircraft due to noise attributable, for example, to ground clutter. As such, aircraft or pilots on board aircraft may rely upon other techniques in an effort to identify ground-based objects in the vicinity of a taxiing aircraft including visual identification of the other objects, one or more cameras configured to capture images from which the other objects may be identified and/or light detection and ranging (LIDAR) systems. However, each of these techniques may be also limited in certain circumstances, such as the limitations imposed upon visual and camera-based techniques due to fog or other weather conditions that may limit the visibility of the other ground-based objects in proximity to a taxiing aircraft. While LIDAR may not be similarly limited by the weather conditions, LIDAR systems generally have a predefined range and resolution, thereby limiting the identification of ground-based objects beyond the range of the LIDAR system.

BRIEF SUMMARY

A radar-based method, apparatus and computer program product are provided in accordance with an example embodiment in order to identify an object in proximity to a vehicle and to generate a model of the object. The method, apparatus and computer program product of an example embodiment at least partially rely upon radar signals, but the method, apparatus and computer program product are configured to analyze the radar signals in such a manner that an object may be reliably identified in proximity to the vehicle even in an instance in which the object is ground-based or is otherwise near the ground by reducing the deleterious impact of the noise otherwise created by ground clutter in at least some conventional radar systems. In the context of an aircraft, the method, apparatus and computer program product of an example embodiment may therefore be configured to reliably identify a runway or other aircraft landing surface during the approach of the aircraft and/or to reliably identify ground-based objects in proximity to the aircraft while the aircraft is taxiing or is preparing to taxi.

In an example embodiment, a method is provided for generating a model of one or more objects relative to a vehicle. The method includes receiving radar information in the form of in-phase quadrature (IQ) data and converting the IQ data to one or more first range-doppler maps. The method further includes evaluating the one or more first range-doppler maps with a machine learning model to generate the model that captures the detection of the one or more objects relative to the vehicle.

The method of an example embodiment also includes receiving information relating to a speed of the vehicle. In this example embodiment, the method evaluates the one or more first range-doppler maps by evaluating the one or more first range-doppler maps and the information relating to the speed of the vehicle with the machine learning model to generate the model that captures the detection of the one or more objects relative to the vehicle. The method of this example embodiment may also include converting the information relating to the speed of the vehicle to a grayscale image and combining the one or more first range-doppler maps and the grayscale image into a combined image. In this example embodiment, the method evaluates the one or more first range-doppler maps and information relating to the speed of the vehicle by evaluating the combined image with the machine learning model to generate the model that captures the detection of the one or more objects relative to the vehicle. The method of an example embodiment receives radar information for each of a plurality of channels, and converts the IQ data to a plurality of first range-doppler maps with each first range-doppler map associated with the radar information for a respective channel.

The method of an example embodiment also includes creating a second range-doppler map associated with a respective first range-doppler map. In this regard, the method creates the second range-doppler map based upon noise data selected from the IQ data in an instance in which the one or more objects are not present. In this example embodiment, the machine learning model may include a range-doppler bin estimation neural network, and the method may evaluate the one or more first range-doppler maps by evaluating the one or more first range-doppler maps and the second range-doppler map with the range-doppler bin estimating neural network to generate range and doppler bins corresponding to the range and velocity of a respective object of the one or more objects. The method of this example embodiment may also include identifying phase and magnitude components of the range-doppler bin corresponding to the range and the velocity of the respective object. The machine learning model of this example embodiment may also include an azimuth angle regression neural network, and the method may evaluate the one or more first range-doppler maps by evaluating the one or more first range-doppler maps and the second range-doppler map with the azimuth angle regression neural network to generate the azimuth angle of the respective object.

The vehicle of an example embodiment may be an air vehicle that is airborne and the one or more objects may be an aircraft landing surface. In this example embodiment, the model of the one or more objects includes a pose of the aircraft landing surface including one or more of an altitude, pitch or roll of the aircraft landing surface. In another example embodiment in which the vehicle is an air vehicle that is airborne, the one or more objects may be another air vehicle that is also airborne. In a further example embodiment in which the vehicle is an air vehicle that is on the ground, the one or more objects may be an obstacle that is also on the ground.

In another example embodiment, a computing device is provided that is configured to generate a model of one or more objects relative to a vehicle. The computing device includes a communication interface configured to receive radar information in the form of in-phase quadrature (IQ) data. The computing device also includes processing circuitry configured to convert the IQ data to one or more first range-doppler maps and to evaluate the one or more first range-doppler maps with a machine learning model to generate the model that captures the detection of the one or more objects relative to the vehicle.

The communication interface of an example embodiment also configured to receive information relating to a speed of the vehicle. In this example embodiment, the processing circuitry is also configured to evaluate the one or more first range-doppler maps by evaluating the one or more first range-doppler maps and the information relating to the speed of the vehicle with the machine learning model to generate the model that captures the detection of the one or more objects relative to the vehicle. The processing circuitry of this example embodiment may be further configured to convert the information relating to the speed of the vehicle to a grayscale image and to combine the one or more first range-doppler maps and the grayscale image into a combined image. In this example embodiment, the processing circuitry is also configured to evaluate the one or more first range-doppler maps and information relating to the speed of the vehicle by evaluating the combined image with the machine learning model to generate the model that captures the detection of the one or more objects relative to the vehicle. In another example embodiment in which the communication interface is configured to receive radar information by receiving radar information for each of a plurality of channels, the processing circuitry is configured to convert the IQ data to one or more first range-doppler maps by converting the IQ data to a plurality of first range-doppler maps with each first range-doppler map associated with the radar information for a respective channel.

The processing circuitry of an example embodiment is further configured to create a second range-doppler map associated with a respective first range-doppler map. In this regard, the processing circuitry is configured to create the second range-doppler map by creating the second range-doppler map based upon noise data selected from the IQ data in an instance in which the one or more objects are not present. In this example embodiment, the machine learning model may include a range-doppler bin estimation neural network and the processing circuitry may be configured to evaluate the one or more first range-doppler maps by evaluating the one or more first range-doppler maps and the second range-doppler map with the range-doppler bin estimating neural network to generate range and doppler bins corresponding to the range and velocity of a respective object of the one or more objects. The processing circuitry of this example embodiment may also be configured to identify phase and magnitude components of the range-doppler bin corresponding to the range and the velocity of the respective object. In this example embodiment, the machine learning model may also include an azimuth angle regression neural network, and the processing circuitry may also be configured to evaluate the one or more first range-doppler maps by evaluating the one or more first range-doppler maps and the second range-doppler map with the azimuth angle regression neural network to generate the azimuth angle of a respective object of the one or more objects.

The vehicle of an example embodiment may be an air vehicle that is airborne and the one or more objects may be an aircraft landing surface. In this example embodiment, the model of the one or more objects includes a pose of the aircraft landing surface including one or more of an altitude, pitch or roll of the aircraft landing surface. In another example embodiment in which the vehicle is an air vehicle that is airborne, the one or more objects may be another air vehicle that is also airborne. In a further example embodiment in which the vehicle is an air vehicle that is on the ground, the one or more objects may be an obstacle that is also on the ground.

In a further example embodiment, a computer program product is provided that is configured to generate a model of one or more objects relative to a vehicle. The computer program product includes at least one non-transitory computer-readable storage medium having computer-executable program code instructions stored therein with the computer-executable program code instructions including program code instructions configured to receive radar information in the form of in-phase quadrature (IQ) data and program code instructions configured to convert the IQ data to one or more first range-doppler maps. The computer-executable program code instructions further include program code instructions configured to evaluate the one or more first range-doppler maps with a machine learning model to generate the model that captures the detection of the one or more objects relative to the vehicle.

The computer-executable program code instructions of an example embodiment further include program code instructions configured to receive information relating to a speed of the vehicle. In this example embodiment, the program code instructions configured to evaluate the one or more first range-doppler maps include program code instructions configured to evaluate the one or more first range-doppler maps and the information relating to the speed of the vehicle with the machine learning model to generate the model that captures the detection of the one or more objects relative to the vehicle. The computer-executable program code instructions of this example embodiment may also include program code instructions configured to convert the information relating to the speed of the vehicle to a grayscale image and combine the one or more first range-doppler maps and the grayscale image into a combined image. In this example embodiment, the program code instructions configured to evaluate the one or more first range-doppler maps and information relating to the speed of the vehicle include program code instructions configured to evaluate the combined image with the machine learning model to generate the model that captures the detection of the one or more objects relative to the vehicle. The program code instructions of an example embodiment are configured to receive radar information for each of a plurality of channels, and to convert the IQ data to a plurality of first range-doppler maps with each first range-doppler map associated with the radar information for a respective channel.

The computer-executable program code instructions of an example embodiment also include program code instructions configured to create a second range-doppler map associated with a respective first range-doppler map. In this regard, the program code instructions are configured to create the second range-doppler map based upon noise data selected from the IQ data in an instance in which the one or more objects are not present. In this example embodiment, the machine learning model may include a range-doppler bin estimation neural network, and the program code instructions may be configured to evaluate the one or more first range-doppler maps by evaluating the one or more first range-doppler maps and the second range-doppler map with the range-doppler bin estimating neural network to generate range and doppler bins corresponding to the range and velocity of a respective object of the one or more objects. The program code instructions of this example embodiment may also be configured to identify phase and magnitude components of the range-doppler bin corresponding to the range and the velocity of the respective object. The machine learning model of this example embodiment may also include an azimuth angle regression neural network, and the program code instructions may be configured to evaluate the one or more first range-doppler maps by evaluating the one or more first range-doppler maps and the second range-doppler map with the azimuth angle regression neural network to generate the azimuth angle of the respective object.

The vehicle of an example embodiment may be an air vehicle that is airborne and the one or more objects may be an aircraft landing surface. In this example embodiment, the model of the one or more objects includes a pose of the aircraft landing surface including one or more of an altitude, pitch or roll of the aircraft landing surface. In another example embodiment in which the vehicle is an air vehicle that is airborne, the one or more objects may be another air vehicle that is also airborne. In a further example embodiment in which the vehicle is an air vehicle that is on the ground, the one or more objects may be an obstacle that is also on the ground.

BRIEF DESCRIPTION OF THE DRAWINGS

Figure 3:
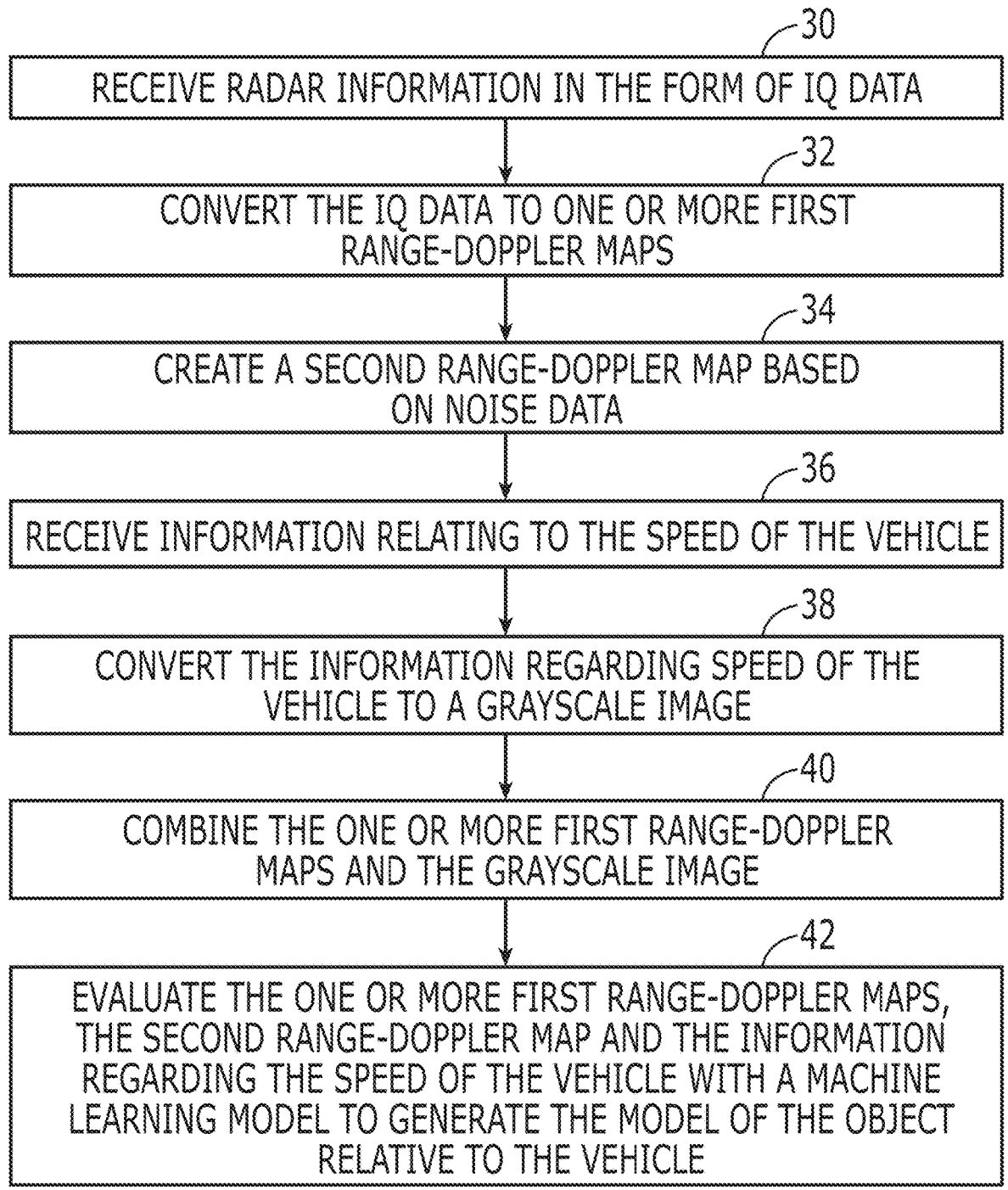
Figure 4:
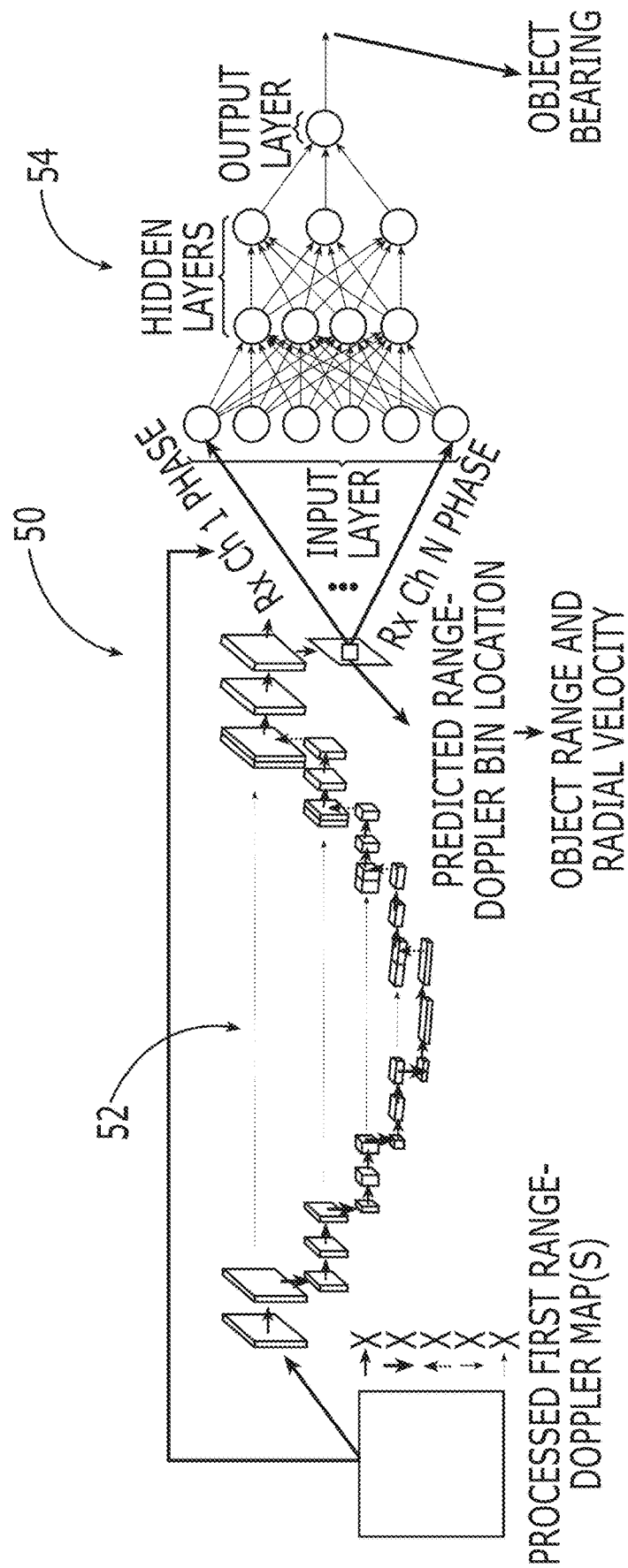
Figure 5:
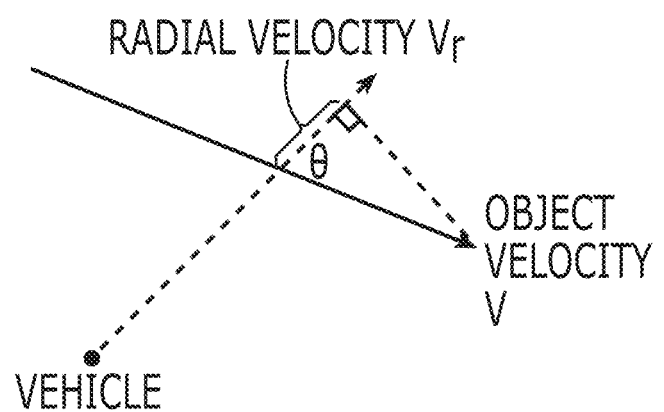
Figure 6:
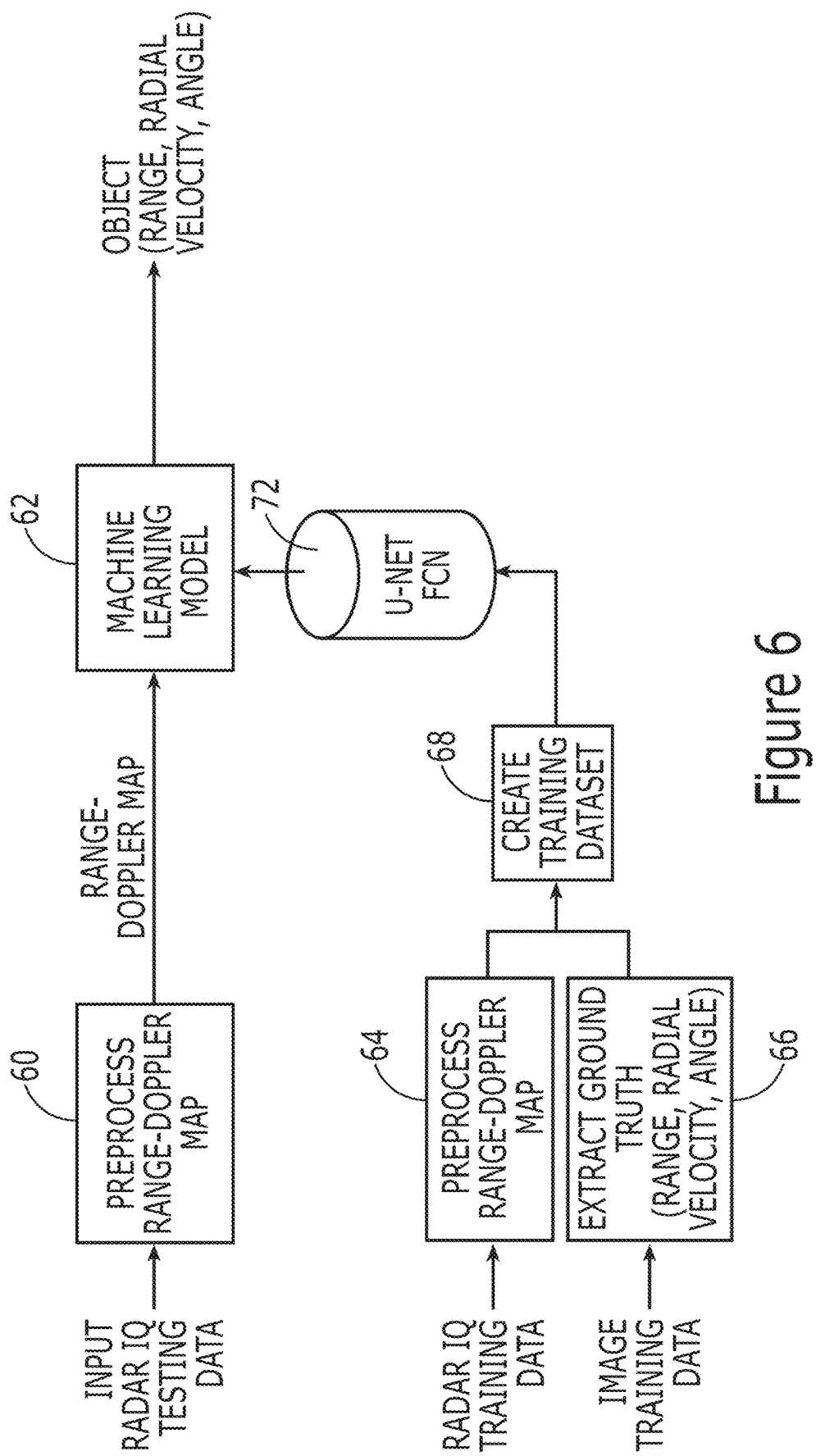
Figure 7:
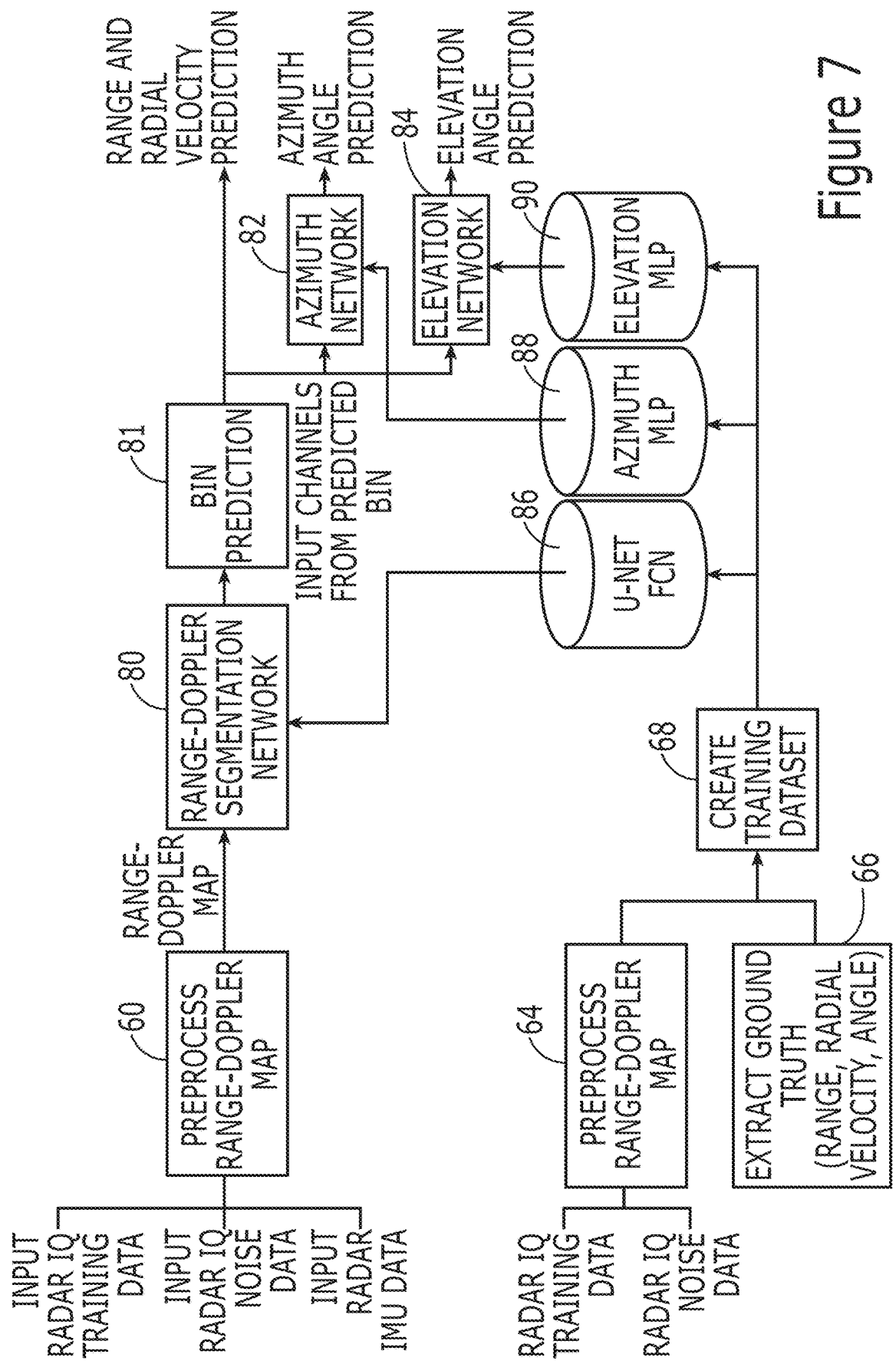
Figure 8:
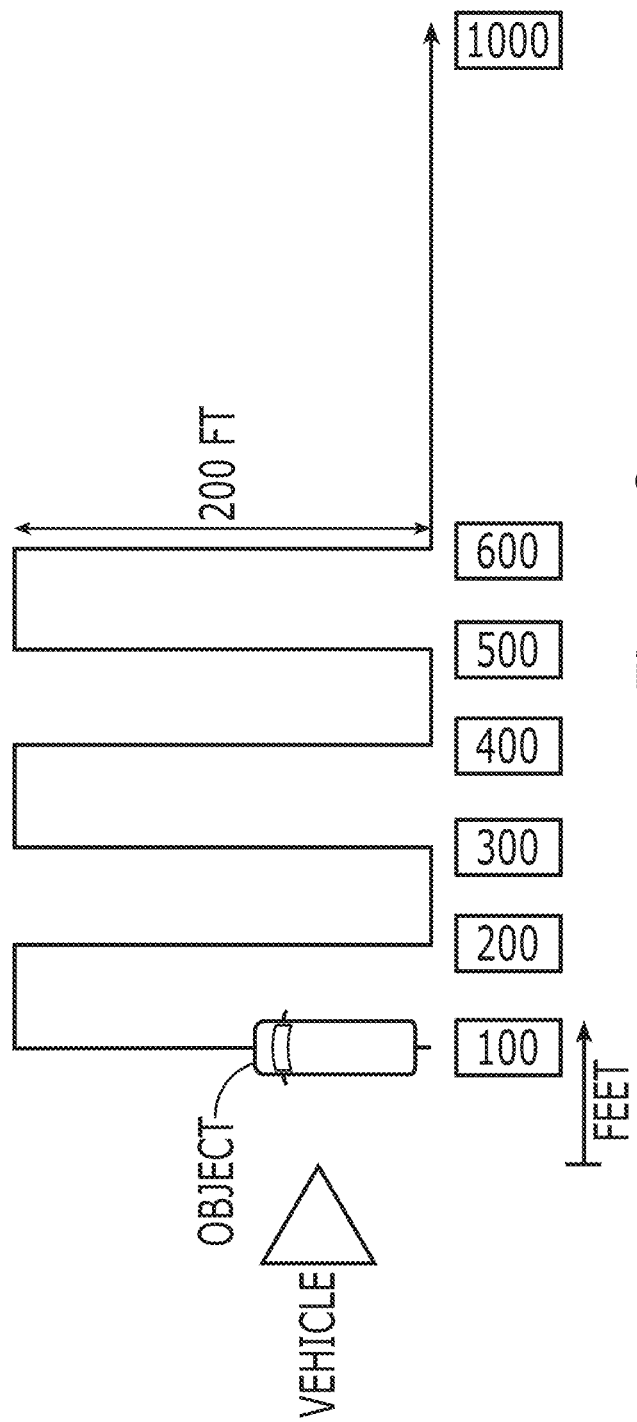

Having thus described certain example embodiments of the present disclosure in general terms, reference will hereinafter be made to the accompanying drawings, which are not necessarily drawn to scale, and wherein:

FIG. 1 is a functional block diagram illustrating operations performed in order to identify an object in proximity to a vehicle utilizing radar-based signals in accordance with an example embodiment;

FIG. 2 is a block diagram of an apparatus that may be specifically configured in accordance with an example embodiment;

FIG. 3 is a flowchart illustrating operations performed, such as by the apparatus of FIG. 2, in accordance with an example embodiment;

FIG. 4 illustrates a neural network that may be trained in order to identify objects in the vicinity of a vehicle based upon radar signals in accordance with an example embodiment;

FIG. 5 illustrates the radial velocity of an object;

FIG. 6 is a block diagram illustrating operations performed in conjunction with the training of the apparatus including the machine learning model in order to identify objects in the vicinity of a vehicle in accordance with an example embodiment;

FIG. 7 is another block diagram illustrating operations performed in conjunction with the training of the apparatus including a machine learning model including a plurality of neural networks configured to identify different attributes of an object in the vicinity of a vehicle in accordance with an example embodiment; and FIG. 8 illustrates the pattern that an object may follow in conjunction with gathering training data for training the machine learning model of an apparatus in accordance with an example embodiment.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, apparatus and computer program product are provided in accordance with an example embodiment in order to utilize radar signals to identify one or more objects in the vicinity of a vehicle, even in instances in which the one or more objects are on or near the ground. The method, apparatus and computer program product may be configured to identify objects in the vicinity of a variety of different vehicles for a variety of different purposes. By way of example, but not of limitation, the method, apparatus and computer program product will be hereinafter described in conjunction with the identification of objects in the vicinity of an aircraft, such as an aircraft in flight or an aircraft on the ground, e.g., an aircraft that is taxiing. However, the method, apparatus and computer program product of another example embodiment may be configured to identify objects in the vicinity of other types of vehicles, such as autonomous or semi-autonomous vehicles, e.g., automobiles. Still further, the method, apparatus and computer program product of an example embodiment may be configured to identify objects in the vicinity of a space vehicle or a marine vehicle, such as a ship. Thus, reference herein to the ground relative to a vehicle embodied by an aircraft is also representative of the water relative to marine vehicles, such as ships, such that reference to ground is also provided by way of example but not of limitation.

As described herein, the method, apparatus and computer program product of an example embodiment are configured to identify one or more objects on or near the ground, e.g., ground-based objects, in the vicinity of a vehicle utilizing radar signals. Thus, in an instance in which the vehicle is an aircraft, the method, apparatus and computer program product of an example embodiment may be configured to identify an aircraft landing surface, e.g., a runway, the ground or the like, such as the elevation, location and bearing of the aircraft landing surface, for an aircraft that is in the process of landing by utilizing radar signals processed in a manner that reduces the deleterious impact of noise otherwise created by ground clutter. In addition, the method, apparatus and computer program product of an example embodiment provide for the identification of ground-based objects in the vicinity of an aircraft that is taxiing by utilizing radar signals that are processed in such a manner as to reduce the adverse impact otherwise created by noise due to ground clutter. Thus, the method, apparatus and computer program product of an example embodiment may facilitate operations of an aircraft, such as landing operations and/or taxiing operations, including in situations that may otherwise limit the reliability of other systems, such as when weather conditions, e.g., fog, may otherwise limit the visibility of the ground-based objects for other types of systems.

Referring now to FIG. 1, a block diagram illustrating the operations performed by a method, apparatus and computer program product of an example embodiment are depicted. As shown, the apparatus of an example embodiment receives radar information, such as raw radar signals in the form of in-phase quadrature (IQ) data. The apparatus is configured to convert the IQ data to one or more range-doppler maps, also known as range-velocity (RV) maps. See block 10 of FIG. 1. In an embodiment in which the radar system obtains radar information at each of a plurality of different beam steering angles, the apparatus is configured to convert the IQ data into a plurality of range-doppler maps, one of which is associated with each beam steering angle at which the radar system collects radar information.

In order to reduce the noise otherwise created by the motion of the vehicle, such as the aircraft, that carries the radar system, the apparatus also takes into account the motion, that is, the vehicle ownship motion. In this regard, the apparatus may also be optionally configured to receive information relating to the speed of the vehicle. This information may be provided by any of a variety of different systems including, for example, a GPS system and/or an inertial measurement unit (IMU). In an example embodiment, the apparatus is configured to convert the information relating to the speed of the vehicle into an image, such as a grayscale image, in which the level of gray is representative of the speed of the vehicle. See block 12 of FIG. 1. For example, the grayscale image that is created may have a level of gray that ranges from white for a vehicle that is moving at a maximum rate of speed to black for a vehicle that is stationary with the levels of gray between white and black representative of different speeds of the vehicle.

As shown in block 14 of FIG. 1, the apparatus is also configured to combine the one or more range-doppler maps 10a and, in the embodiment in which information relating to the speed of the vehicle is received, the grayscale image 12a that is representative of the speed of the vehicle into a combined image. The apparatus of this example embodiment is further configured to evaluate the one or more range-doppler maps and optionally the information relating to the speed of the vehicle, such as the grayscale image representative of the speed of the vehicle, with a machine learning model 16 that has been trained to generate a model that captures the detection of the one or more objects relative to the vehicle. Although a model of a plurality of objects may be generated in an instance in which a plurality of objects are identified by the radar system, the method, apparatus and computer program product of an example embodiment are described hereinafter in relation to the detection of one object and the generation of a model of the object by way of example, but not of limitation. The model of the object relative to the vehicle may be defined in various manners. In an example embodiment, however, the model of the object in the vicinity of the vehicle is defined by a plurality of attributes, such as attributes defining the position of the object, such as in terms of x, y and z, attributes defining the size of the object, such as in terms of the width and height of the vehicle, an attribute defining the motion of the object, such as in terms of a velocity vector and/or an attribute defining the type of object, such as the classification of the object. In addition, information may be provided regarding the accuracy of the model of the object such as by providing a confidence value associated with each of at least some of the attributes and, in an example embodiment, an attribute that defines the signal-to-interference-plus-noise ratio (SINR).

Based upon the model of the object that is derived based at least in part upon radar information, the vehicle is informed of the object and may be controlled accordingly. For example, in an instance in which the vehicle is an aircraft that is intending to land on an aircraft landing surface, such as a runway, the aircraft landing surface may be identified based at least partially upon the radar signals to facilitate the landing of the aircraft upon the aircraft landing surface, even in adverse weather conditions that limit visibility. Additionally or alternatively, in an instance in which the object is a ground-based object in the vicinity of an aircraft that is taxiing, the object may be identified based at least partially upon the radar information such that the aircraft that is taxiing is informed of the object and can perform the taxiing operations in such a manner as to avoid interaction with the object that has been identified.

Referring now to FIG. 2, the apparatus 20 of an example embodiment that may be configured in order to identify an object in the vicinity of a vehicle is depicted. The apparatus may be embodied by any of a variety of computing devices including, for example, a server, a computer workstation, a network of distributed computing devices, a personal computer, a tablet computer, etc. Thus, the apparatus does not require a specific hardware design, but any of a variety of computing devices may be configured to operate as described herein. Regardless of the type of computing device that embodies the apparatus, the apparatus of this example embodiment includes, is associated with or is otherwise in communication with processing circuitry 22, memory device 24 and a communication interface 26. In some embodiments, the apparatus also optionally includes, is associated with or is in communication with a user interface 28.

In some embodiments, the processing circuitry 22 (and/or co-processors or any other processors assisting or otherwise associated with the processing circuitry) can be in communication with the memory device 24 via a bus for passing information among components of the apparatus 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment can also include the communication interface 26. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

The apparatus 20 may also optionally include a user interface 28 that may, in turn, be in communication with the processing circuitry 22 to provide output to the user and, in some embodiments, to receive an indication of a user input. The user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory device 24, and/or the like).

Referring now to FIG. 3, the operations performed, such as by the apparatus 20 of FIG. 2, are depicted. As shown in block 30, the apparatus, such as the processing circuitry 22 of FIG. 2, the communication interface 26 of FIG. 2 or the like, is configured to receive radar information, such as raw radar signals in the form of IQ data. The radar information is received from a radar system which, in one embodiment, is on board the vehicle. For example, in an instance in which the vehicle is an aircraft, the aircraft may include an onboard radar system configured to collect and provide the radar signals. Although the distance to the object, that is the range, as well as its velocity may be determined from radar information received via a single receive channel, the radar information may be received by multiple receive channels supported by different antennas of the radar system, such as two channels, five channels or more, e.g., 25 channels, in order to permit the azimuth or elevation angle of the object relative to the radar system to be determined. As shown in block 32 of FIG. 3, the apparatus, such as the processing circuitry, is also configured to convert the IQ data to one or more initial range-doppler maps, which will be referenced herein as first range-doppler maps, also known as RV maps. The processing circuitry may be configured to convert the IQ data to one or more range-doppler maps in various manners.

Although the IQ data may be converted to range-doppler map(s) in various manners, the processing circuitry of an example embodiment is configured to convert the IQ data by initially arranging the IQ data into a radar data cube format with dimensions in the order of receive channels, fast time and slow time. In an instance in which the data is in an integer data format, the processing circuitry 22 of FIG. 2 is configured to convert the integer data to float and to divide the resulting data by a maximum of the data in the integer format to limit the data to a predefined range, such as [−1,1]. The processing circuitry of this example embodiment may also be configured to apply a Kaiser window with $\beta$=2.5 to both the fast time and slow time dimensions, where the length of the window matches the dimensionality for the respective dimensions After windowing, the processing circuitry is configured to determine a two-dimensional (2D) fast Fourier transform (FFT) along both the fast time and slow time dimensions so that the projection maintains the same dimensionality. The processing circuitry of this example embodiment is then configured to index the resulting projection to move the zeroth slow time, or radial velocity, bin to the center along the slow time dimension, while the zeroth fast time, or range, bin remains as the first element along the fast time dimension. In an alternative embodiment, the window specification can be changed to reduce side-lobe noise in the Fourier domain. Additionally, the length of the FFT can be changed to obtain bin resolutions that are finer or courser than those specified by the radar configuration.

In an alternative embodiment, the apparatus 20, such as the processing circuitry 22, may be configured to perform additional processing to correct the doppler effect introduced into the first range-doppler map(s) resulting from a radar system that is in motion, such as by being onboard a vehicle that is in motion. In this regard, the radar system may provide an indication of being in motion by a signal provided by a radar IMU or GPS. The doppler effect causes time dilation (for increasing radial velocity) or compression (for decreasing radial velocity) in the underlying time series data so the radar data must be resampled. In this regard, the apparatus, such as the processing circuitry, may be configured to linearize the problem by considering a relatively small time window around each radar data sample. The doppler effect is caused by a non-constant radial velocity Ur, which results in an accumulation of phase, indicative of the doppler effect, by the moving vehicle's angular velocity $\omega_d$ through the relationship $\omega_d=4\pi v_r/(f\lambda)$, where f is the pulse repetition frequency of the radar chirps and $\lambda$ is the wavelength of the chirp's center frequency. With reference to FIG. 5, the radial velocity may be defined to be $v_r$=v cos $\theta$. In an instance in which the angle $\theta$ can be assumed to be constant within this relatively small time window, the doppler effect can be linearized to just the radial velocity component. The apparatus, such as the processing circuitry, is then configured to compensate for the doppler effect by removing the frequency component $\omega_d$ from the phase of the range FFT before calculating the doppler FFT in the range-doppler map calculation.

In some embodiments, the radar system is configured to capture radar information along each of a plurality of different beam steering angles and to provide radar information associated with each of these different beam steering angles. In this example embodiment, the apparatus, such as the processing circuitry, is configured to separately convert the IQ data associated with each different beam steering angle along which radar information is collected to a respective range-doppler map such that a plurality of range-doppler maps are created, one of which is associated with each beam steering angle along which radar information was collected. In this regard, FIG. 1 depicts the creation of four range-doppler maps, one of which is associated with each of the four different radar channels at the time that the radar system collected radar information.

As shown in block 36, the apparatus 20, such as the processing circuitry 22, the communication interface 26 or the like, may optionally be configured to receive information relating to the speed of the vehicle. The information regarding the speed of the vehicle may be provided by any of a variety of systems, at least some of which are also onboard the vehicle. For example, a GPS system may provide information regarding the speed of the vehicle and/or an IMU may provide information regarding the speed of the vehicle. In an example embodiment, the apparatus, such as the processing circuitry, is configured to convert the information relating to the speed of the vehicle to a grayscale image, such as described above in which the gray level of the resulting image is representative of the speed of the vehicle. In this example embodiment and as shown in block 40 of FIG. 3, the apparatus, such as the processing circuitry, is configured to combine the one or more first range-doppler maps and, in embodiments in which information regarding the speed of the vehicle is received, the grayscale image representative of the speed of the vehicle into a combined image.

As shown in block 42 of FIG. 3, the apparatus 20, such as the processing circuitry 22, is also configured to evaluate the one or more first range-doppler maps and optionally the information relating to the speed of the vehicle with a machine learning model to generate the model that captures the detection of the object relative to the vehicle. In this regard, the processing circuitry is configured to evaluate the one or more first range-doppler maps and optionally the information relating to the speed of the vehicle by evaluating the combined image with the machine learning model in order to generate the model of the object relative to the vehicle. The model of the object relative to the vehicle that is generated may be defined in various manners including the definition of a plurality of attributes, such as positional attributes, size attributes, velocity attributes, classification attributes and associated confidence values.

A variety of different machine learning models may be trained in order to evaluate the one or more first range-doppler maps and information relating to the speed of the vehicle. In an example embodiment, the machine learning model includes one or more neural networks, such as a range-doppler bin estimation neural network in order to identify the range and the velocity, such as the radial velocity of the object, and an azimuth angle regression neural network in order to determine the azimuth angle of the object. Although the machine learning model and, more particularly, a machine learning model 50 of FIG. 4 that includes both a range-doppler bin estimation neural network 52 and an azimuth angle regression neural network 54 may be embodied in various manners, one example of such a machine learning model is depicted in FIG. 4.

In this example embodiment, the range-doppler bin estimation neural network 52 is a U-Net variant. The encoder of the range-doppler bin estimation neural network of this example embodiment has five stages with a downsampling layer, such as a 2D max-pooling layer with a 2×2 kernel size, between each stage as depicted on the left-hand side of FIG. 4. Within each stage, there are a series of 2D convolutional layers with circular padding of one element and a 3×3 kernel size followed by an exponential linear unit (elu) activation. In an example embodiment, the first stage has one of these series and the subsequent stages have two of these series. The decoder of the range-doppler bin estimation neural network may include four stages, each prepended by an upsampling layer, such as a 2D transposed convolution with a 2×2 kernel size and a stride of 2. As is characteristic of a U-Net architecture, the input of each decoder stage is a concatenation of the output of the corresponding encoder stage and the upsampling result from the prior stage. Each decoder stage of this example embodiment has two series of the convolutional layer and activation from the encoder stages. The output of the final decoder stage may go through a final 2D convolutional layer with a 1×1 kernel size.

The input size to the range-doppler bin estimation neural network 52 may vary along the channel dimension, which will depend upon the configuration of the radar system. However, the range-doppler bin estimation neural network of an example embodiment restricts the dimensionality of the range and radial velocity dimensions in that the dimensions must be divisible by 16 due to the four downsampling stages. The output of the range-doppler bin estimation neural network is a single channel with the same range and radial velocity dimensionality as the input, where there will be a relatively high activation in the bins corresponding to where the network believes the target of interest will be.

In terms of optimization, the ground truth training data may be provided as described below in an example embodiment as a single channel binary map with the same range and radial velocity dimensionality as the input with a predefined value, e.g., 1, in the ground truth bin locations of the object of interest and a different predefined value, e.g., 0, in the other locations. In an example embodiment, the loss function is a binary cross entropy function with a sigmoidal activation and the optimizer employs a stochastic gradient descent with a predefined learning rate, e.g., 5e-4, and a predefined Nesterov momentum, e.g., 0.9. The learning rate of an example embodiment may follow a schedule in which the learning rate will decrease by an order of magnitude if out of the four prior validation epochs, the minimum of such validation losses multiplied by a predefined factor, e.g., 1-1e-4, is less than the validation loss of the current epoch.

In relation to the azimuth angle regression neural network 54 of FIG. 4, the input are the four channels, e.g. Rx Ch 1 Phase, . . . , Rx Ch N Phase, from the first range-doppler map(s) at the range-doppler bin location predicted by the range-doppler bin estimation neural network 52. The channels contain real and imaginary components that are split so that the input size to the azimuth angle regression neural network is an 8×1 array. In this example embodiment, the apparatus 20, such as the processing circuitry 22, is configured to normalize each channel to have a zero mean and unit variance by calculating the mean and variance of the training data set as described below. While the azimuth angle regression neural network may have various configurations, the azimuth angle regression neural network of the example embodiment of FIG. 4 has an input layer, a plurality of hidden layers and an output layer and, in one example embodiment, is a multi-layer perceptron with 7 hidden layers. The first 7 layers of this example embodiment consist of 20 fully connected units with rectified linear unit (relu) activation with the final layer outputting a single number for the bearing of the object. In relation to the training of the azimuth angle regression neural network as described below, the apparatus, such as the processing circuitry, may be configured to use a predefined learning rate, e.g., 1e-3, and Adam optimizer on mean square error loss between the predicted and ground truth angle values.

In this example embodiment, the radar information that is received is initially processed in order to identify and represent the noise within the radar information such that the radar information representative of the object can be distinguished and more accurately identified. In this regard and as shown in block 34 of FIG. 3, the apparatus 20, such as the processing circuitry 22, may be configured to create a second range-doppler map associated with a respective first range-doppler map and based upon at least some of the radar information, that is, the IQ data from which the first-range-doppler map is created. In this regard, the processing circuitry is configured to create the second range-doppler map based upon noise data that is randomly selected from a portion of the IQ data that does not include and is not representative of the object and is then converted in the manner described above to create the second range-doppler map. In an embodiment in which the radar information is collected at each of a plurality of beam steering angles, noise data is obtained and a second range-doppler map is created for each beam steering angle. The machine learning model 50 and, more particularly, the range-doppler bin estimation neural network 52 is then configured to evaluate the one or more first range-doppler maps by evaluating one or more first range-doppler maps and the second range-doppler map and, in embodiments in which information relating to the speed of the vehicle is received, also information relating to the speed of the vehicle with the range-doppler bin estimation neural network to generate range and doppler bins corresponding to the range and velocity of the object. The processing circuitry of this example embodiment is then configured to identify phase and magnitude components of the range-doppler bin corresponding to the range and the velocity of the object.

Although the velocity of the object may be defined in various manners, the apparatus 20, such as the processing circuitry 22, of an example embodiment is configured to determine the radial velocity of the object. As shown in FIG. 5, which depicts the location of the vehicle and the path of travel of the object relative to the vehicle, the radial velocity of the object at a respective point in time at which the radar information is captured represents that component of the velocity of the object extending in the direction defined by the line extending from the vehicle to the object at the respective point in time.

Prior to providing the machine learning model 50 with the first and second range-doppler maps, the apparatus 20, such as the processing circuitry 22, of an example embodiment may be configured to extract a user-specified crop of the first and second range-doppler maps with a predefined range of range bins and radial velocity bins of interest in order to limit the computations performed by the machine learning model. In this example embodiment, the apparatus, such as the processing circuitry, is configured to subtract the phase angle of each bin in the first receive channel from the respective bins in each of the receive channels for both the first and second range-doppler maps. This subtraction operates on the phase component of the FFT data and result range-doppler maps will have zero phase in their first receive channels. For both the first and second range-doppler maps, the apparatus, such as the processing circuitry, of this example embodiment is configured to double the length of the first dimension by interleaving the real and imaginary components of each receive channel in order to change the data representation from complex to float for input to the machine learning model. In an example embodiment, the apparatus, such as the processing circuitry, is also configured to concatenate the resulting first and second range-doppler maps to form the input sample to the machine learning model, such as the range-doppler bin estimation neural network 52. The input sample may be normalized in an example embodiment, such as by the mean and the standard deviation of the respective training datasets as described below, prior to the forward pass of the range-doppler bin estimation neural network.

In the example embodiment in which the machine learning model 50 also includes an azimuth angle regression neural network 54, the apparatus 20, such as the processing circuitry 22, is also configured to evaluate the one or more first range-doppler maps by evaluating the one or more first range-doppler maps and the second range-doppler map and, in embodiments in which information regarding the speed of the vehicle is received, also information relating to the speed of the vehicle with the azimuth angle regression neural network to generate the azimuth angle of the object. In this regard, the azimuth angle regression neural network may be configured to evaluate the range-doppler bins constructed by the range-doppler bin estimation neural network 52 and, more particularly, the range-doppler bin corresponding to the range and radial velocity of the object of interest, such as the range-doppler bin estimated by the range-doppler bin estimation neural network, and to generate the azimuth angle of the object based thereupon. In relation to the first and second range-doppler maps provided to the azimuth angle regression neural network, noise data is not considered in relation to the evaluation performed by the azimuth angle regression neural network. Instead, the phase and magnitude components for the range-doppler bin for each receive channel corresponding to the range and radial velocity of the object of interest are concatenated to form the input sample to the azimuth angle regression neural network. In an example embodiment, the input sample may be normalized, such as by the mean and the standard deviation of the respective training datasets as described below, prior to the forward pass of the azimuth angle regression neural network.

In an alternative embodiment, the apparatus 20, such as the processing circuitry 22, is configured such that the azimuth angle regression neural network 54 regresses to the elevation of the object of interest. In this alternative embodiment, the regression neural network may have a comparable architecture except that the output would be elevation of the object as opposed to the azimuth angle of the object. In yet another example embodiment, the machine learning model may include both an azimuth angle regression neural network and an elevation regression neural network as shown in FIG. 7 and described below.

As a result, the object may be defined in terms of the range and the velocity, e.g., the radial velocity, as defined by the range-doppler bin estimation neural network 52 and the azimuth angle, also referred to as the bearing, of the object as defined by the azimuth angle regression neural network 54. The vehicle may therefore be informed of the object and can be directed, such as by a pilot or by a control system, to take action based thereupon. For example, information regarding the object, such as one or more of the attributes of the object, may be provided to and presented by the user interface 28 in one embodiment.

The action that is to be taken may include the intersection with the object in a controlled fashion, such as in terms of an aircraft landing upon an aircraft landing surface, e.g., a runway, the ground or the like, or the avoidance of the object, such as while the aircraft is on the ground, e.g., an aircraft taxiing on an airfield that is informed of and that taxies in a manner that avoids the one or more other ground-based objects that have been identified, or while the aircraft is airborne, e.g., an aircraft in flight that establishes its trajectory so as to clearly avoid one or more other airborne air vehicles. In this regard, in an instance in which the vehicle is an air vehicle, such as an aircraft that is airborne, and the object is an aircraft landing surface, the model of the object that is generated includes the pose of the aircraft landing surface including one or more of the altitude, pitch and roll of the aircraft landing surface. Thus, the aircraft can be reliably guided to and landed upon the aircraft landing surface, even in adverse weather conditions, such as fog, that impact the visibility of the runway.

The machine learning model is trained in accordance with another example embodiment of the present disclosure. As shown in FIG. 6, IQ data is received and is preprocessed as shown in block 60 to convert the IQ data into one or more first range-doppler maps (and, in some embodiments, a second range-doppler map representative of the noise in the IQ data) that are then provided to a machine learning model 62 to generate a model of an object as described above in conjunction with block 42 of FIG. 3. The machine learning model is trained utilizing IQ training data and/or training data representative of the speed of the vehicle. In the example depicted in FIG. 6, IQ training data is provided representative of the IQ data received relative to a predefined object having a predetermined location relative to the vehicle and moving in a predefined trajectory relative to the vehicle. Additionally, training data regarding the speed of the predefined vehicle may also be provided. Further details regarding the training data are provided below.

The apparatus 20, such as the processing circuitry 22, of this example embodiment is configured to preprocess the IQ training data as shown in block 64, such as by converting the IQ training data, to one or more range-doppler maps as described above in conjunction with block 32 of FIG. 3 and the apparatus, such as the processing circuitry, which is also optionally configured to process the training data representative of the speed of the vehicle so as to extract the speed of the vehicle, such as a radial velocity, and, in some embodiments, the range and the azimuth angle of the object relative to the vehicle. See block 66. The training data regarding the speed of the object may be provided in various manners, such as by being provided based upon a plurality of images captured over time that include the object, such as a video of the object, and/or information provided by GPS, an IMU and/or LIDAR that provide information regarding the object. The apparatus, such as the processing circuitry, then combines the one or more range-doppler maps and optionally the information regarding the speed of the vehicle and, in some embodiments, the range and the azimuth angle of the object, to create a training dataset. See block 68.

In an example embodiment, various attributes of the object may be labeled in the training dataset, such as manually or in an automated manner by the processing circuitry. The attributes that may be labeled include, for example, one or more of the position of the object, such as in terms of relative offset from the vehicle in x, y and z coordinates, the orientation of the object relative to the vehicle, such as in terms of pitch, roll and yaw, and the classification of the object, such as in terms of automobile, truck, small aircraft, large aircraft, etc. The attributes of the object are also reference herein as ground truth attributes.

The machine learning model, such as a U-Net Fully Convolutional Network (FCN) 72, is then provided with this training dataset in order to train the machine learning model to more accurately generate the model of the object. In this regard, the apparatus 20, such as the processing circuitry 22, may be configured to provide a plurality of different training datasets to the machine learning model representative of the object at different locations and moving in accordance with different trajectories relative to the vehicle with the machine learning model generating a model of the object in response to each training dataset. The apparatus, such as the processing circuitry, is then configured to compare the model of the object generated by the machine learning model to the predetermined location, trajectory and speed of the object and to modify the machine learning model in response to the differences therebetween such that the machine learning model subsequently generates the model of the object in a more accurate manner. This process can continue in a repeated fashion until the machine learning model has been trained to generate the object of the model with sufficient accuracy and reliability. At this point, the trained machine learning model may be provided so as to evaluate radar information as described above in relation to FIG. 3.

As shown in FIG. 7 and as described above, the machine learning model of an example embodiment may include one or more additional neural networks for generating attributes of the model of the object. In this regard, the machine learning model 50 described above in relation to FIG. 4 includes a range-doppler bin estimation neural network 52 and an azimuth angle regression neural network 54. However, the machine learning model of another example embodiment may include one or more additional neural networks for generating respective attributes of the model of the object. In this regard, the machine learning model of the example embodiment of FIG. 7 includes a range-doppler bin estimation neural network 80 to generate range and doppler bins and to generate a prediction of the bin as shown at block 81 corresponding to the range and velocity of the object and an azimuth angle regression neural network 82 to evaluate the range and doppler bins, such as the predicted bin, and generate the azimuth angle of the object. However, the machine learning model of this example embodiment also includes an elevation angle regression neural network 84 that is configured to evaluate the range and doppler bins, such as the predicted bin, and to generate the elevation angle of the object relative to the vehicle.

In this example embodiment, each of these three neural networks may be trained, such as concurrently, in the manner described above using a plurality of different training datasets in order to more accurately and reliably generate a model of the object. Although the range-doppler bin estimation neural network 80, the azimuth angle regression neural network 82 and the elevation angle neural network 84 may be the same type of neural network, the embodiment of FIG. 7 employs different types of neural networks, such as by providing for training of a U-Net FCN 86 for the range-doppler bin estimation neural network and multilayer perceptron networks 88, 90 for the azimuth angle regression neural network and the elevation angle neural network.

As also shown in FIG. 7, both the IQ data and the IQ training data may also include IQ noise data. The apparatus 20, such as the processing circuitry 22, may be configured to separate the IQ noise data from the IQ data (or the IQ training data) representative of the object. The IQ noise data may then be processed to construct a second range-doppler map as described above in order to the allow the object to be identified and the model of the object constructed in a more accurate manner.

The training data may be generated in various manners. For example, the training data may be captured with the object in a predefined position relative to the vehicle and the object and/or the vehicle moving in accordance with a predefined trajectory and at a predefined speed. By way of example, but not of limitation, the training dataset that is representative of an object on the ground that may be identified by a radar system, such as a radar system onboard a vehicle, such as an aircraft, on the ground or a ground-based radar system, may be based upon the object and/or the vehicle moving in one or more predetermined pattern(s) with training data captured as the object and/or the vehicle moves in the predetermined pattern(s).

For example, an object, such as a bus or van, may travel in a predefined zigzag pattern in front of a vehicle, such as an aircraft, that is stationary with the radar system capturing radar information that includes the object as the object travels in the predefined zigzag pattern. One example of a zigzag pattern is shown in FIG. 8 in which the object travels at a predefined speed, such as 5 miles per hour (mph), back and forth in front of the vehicle with the spacing of the object from the vehicle being at 100 foot increments, such as 100 feet, 200 feet, 300 feet, 400 feet, 500 feet and 600 feet, with the object thereafter traveling directly away from the vehicle to a distance of 1,000 feet from the vehicle. Radar information may be collected by the radar system as the object travels in the zigzag pattern of FIG. 8. The radar system may also collect radar information as the object follows the same pattern but in the opposite direction, such as by directly approaching the vehicle at 5 mph from a predefined distance, such as 1,000 feet, and then commencing a zigzag pattern upon reaching a second predefined distance, such as 600 feet, from the vehicle. As before, the zigzag pattern may continue until the object is within 100 feet of the vehicle. The lateral movement of the object as the object zigzags in front of the vehicle may also be of a predefined distance, such as 200 feet.

The radar system may also capture additional radar information relating to an object that dynamically moves relative to a static vehicle to be included in a training dataset gathered as the object travels away from the vehicle, such as in a linear pattern directly away from the vehicle. This training dataset may be gathered with the object moving away from the vehicle at each of a plurality of different speeds, such as 5 mph, 10 mph and 15 mph. The radar system may also collect radar information in instances in which the object is static or stationary and the vehicle is moving or dynamic. In this example embodiment, the radar system may collect radar information in an instance in which the vehicle is moving toward the object at a predefined speed, such as with the side of the object facing the vehicle. The radar system may also capture radar information with the vehicle moving in the same manner and at the same speed relative to the object, but with the object differently positioned relative to the vehicle, such as with the front of the object facing the vehicle and also with the rear of the object facing the vehicle. The radar system may also capture radar information with the vehicle again moving at a predefined velocity, such as 5 knots, but with the object offset from the path of travel of the vehicle by a predefined distance and in a predefined direction, such as by being offset 100 feet to the left of the vehicle with the side of the object facing the vehicle. Based upon the training data captured as described above, the machine learning model may be trained so as to identify various ground-based objects relative to a ground-based vehicle, such as an aircraft that is performing taxiing operations.

The radar system may additionally or alternatively capture radar information to serve as training data relating to runways or other aircraft landing surfaces that are identified by a vehicle, such as an aircraft, while the aircraft is in flight, and/or other radar information to serve as training data relating to other airborne objects identified by the vehicle, such as an aircraft, while the vehicle is in flight. Based upon the various training datasets, the machine learning model may be trained so as to accurately and repeatedly generate a model of an object. In some embodiments, the radar-based machine learning model may be employed in combination with one or more other modalities, such as cameras and/or LIDAR, in order to identify objects with increased confidence. The vehicle can then be controlled, such as by a pilot or a control system, to take the appropriate action in a more informed manner relative to the object. For example, an aircraft that is in the process of landing can more accurately and reliably identify a pose of an aircraft landing surface, such as the altitude, pitch and/or roll of the aircraft landing surface, in order to facilitate landing of the aircraft, even in instances in which visibility conditions are poor, such as due to fog or the like. Additionally, in instances in which a vehicle, such as an air vehicle, is airborne and a model of another airborne object is generated, the air vehicle can take an appropriate action, such as by revising its trajectory, so as to safely avoid the other air vehicle. Alternatively, in instances in which the vehicle, such as an air vehicle is on the ground, such as during taxiing operations, other objects, such as obstacles, that are also on the ground may be identified based upon the model generated by the machine learning model and safely avoided.

As described above, FIGS. 1, 3, 6 and 7 are flowcharts of an apparatus 20, method, and computer program product configured to identify a floor of a multi-story building according to an example embodiment. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of generating a model of one or more objects relative to a vehicle, the method comprising:
  receiving radar information in the form of in-phase quadrature (IQ) data;
  converting the IQ data to one or more first range-doppler maps; and
  evaluating the one or more first range-doppler maps with a machine learning model to generate the model that captures detection of the one or more objects relative to the vehicle.

2. A method according to claim 1 further comprising receiving information relating to a speed of the vehicle, wherein evaluating the one or more first range-doppler maps comprises evaluating the one or more first range-doppler maps and the information relating to the speed of the vehicle with the machine learning model to generate the model that captures the detection of the one or more objects relative to the vehicle.

3. A method according to claim 2 further comprising:
  converting the information relating to the speed of the vehicle to a grayscale image; and
  combining the one or more first range-doppler maps and the grayscale image into a combined image,
  wherein evaluating the one or more first range-doppler maps and information relating to the speed of the vehicle comprises evaluating the combined image with the machine learning model to generate the model that captures the detection of the one or more objects relative to the vehicle.

4. A method according to claim 1 wherein receiving radar information comprises receiving radar information for each of a plurality of channels, and wherein converting the IQ data to one or more first range-doppler maps comprises converting the IQ data to a plurality of first range-doppler maps with each first range-doppler map associated with the radar information for a respective channel.

5. A method according to claim 1 further comprising creating a second range-doppler map associated with a respective first range-doppler map, wherein creating the second range-doppler map comprises creating the second range-doppler map based upon noise data selected from the IQ data in an instance in which the one or more objects are not present.

6. A method according to claim 5 wherein the machine learning model comprises a range-doppler bin estimation neural network, and wherein evaluating the one or more first range-doppler maps comprises evaluating the one or more first range-doppler maps and the second range-doppler map with the range-doppler bin estimating neural network to generate range and doppler bins corresponding to the range and velocity of a respective object of the one or more objects.

7. A method according to claim 6 further comprising identifying phase and magnitude components of the range-doppler bin corresponding to the range and the velocity of the respective object.

8. A method according to claim 7 wherein the machine learning model comprises an azimuth angle regression neural network, and wherein evaluating the one or more first range-doppler maps comprises evaluating the one or more first range-doppler maps and the second range-doppler map with the azimuth angle regression neural network to generate the azimuth angle of the respective object.

9. A method according to claim 1 wherein the vehicle comprises an air vehicle that is airborne and the one or more objects comprises an aircraft landing surface, and wherein the model of the one or more objects comprises a pose of the aircraft landing surface including one or more of an altitude, pitch or roll of the aircraft landing surface.

10. A method according to claim 1 wherein the vehicle comprises an air vehicle that is airborne and the one or more objects comprises another air vehicle that is also airborne.

11. A method according to claim 1 wherein the vehicle comprises an air vehicle that is on the ground and the one or more objects comprises an obstacle that is also on the ground.

12. A computing device configured to generate a model of one or more objects relative to a vehicle, the computing device comprising:
a communication interface configured to receive radar information in the form of in-phase quadrature (IQ) data; and
processing circuitry configured to convert the IQ data to one or more first range-doppler maps and to evaluate the one or more first range-doppler maps with a machine learning model to generate the model that captures detection of the one or more objects relative to the vehicle.

13. A computing device according to claim 12 wherein the communication interface is further configured to receive information relating to a speed of the vehicle, and wherein the processing circuitry is further configured to evaluate the one or more first range-doppler maps and the information relating to the speed of the vehicle with the machine learning model to generate the model that captures the detection of the one or more objects relative to the vehicle.

14. A computing device according to claim 13 wherein the processing circuitry is further configured to:
convert the information relating to the speed of the vehicle to a grayscale image; and
combine the one or more first range-doppler maps and the grayscale image into a combined image,
wherein the processing circuitry is also configured to evaluate the one or more first range-doppler maps and information relating to the speed of the vehicle by evaluating the combined image with the machine learning model to generate the model that captures the detection of the one or more objects relative to the vehicle.

15. A computing device according to claim 12 wherein the communication interface is configured to receive radar information by receiving radar information for each of a plurality of channels, and wherein the processing circuitry is configured to convert the IQ data to one or more first range-doppler maps by converting the IQ data to a plurality of first range-doppler maps with each first range-doppler map associated with the radar information for a respective channel.

16. A computing device according to claim 12 wherein the processing circuitry is further configured to create a second range-doppler map associated with a respective first range-doppler map, wherein the processing circuitry is configured to create the second range-doppler map by creating the second range-doppler map based upon noise data selected from the IQ data in an instance in which the object is not present.

17. A computing device according to claim 16 wherein the machine learning model comprises a range-doppler bin estimation neural network, and wherein the processing circuitry is configured to evaluate the one or more first range-doppler maps by evaluating the one or more first range-doppler maps and the second range-doppler map with the range-doppler bin estimating neural network to generate range and doppler bins corresponding to the range and velocity of a respective object of the one or more objects.

18. A computing device according to claim 17 wherein the processing circuitry is further configured to identify phase and magnitude components of the range-doppler bin corresponding to the range and the velocity of the respective object.

19. A computing device according to claim 16 wherein the machine learning model comprises an azimuth angle regression neural network, and wherein the processing circuitry is configured to evaluate the one or more first range-doppler maps by evaluating the one or more first range-doppler maps and the second range-doppler map with the azimuth angle regression neural network to generate the azimuth angle of a respective object of the one or more objects.

20. A computing device according to claim 12 wherein the vehicle comprises an air vehicle that is airborne and the one or more objects comprises an aircraft landing surface, and wherein the model of the one or more objects comprises a pose of the aircraft landing surface including one or more of an altitude, pitch or roll of the aircraft landing surface.

* * * * *